United States Patent
Stoiber et al.

(10) Patent No.: US 8,505,268 B2
(45) Date of Patent: Aug. 13, 2013

(54) CONTAINER TREATMENT PLANT AND METHOD FOR THE TREATMENT OF CONTAINERS

(75) Inventors: Christian Stoiber, Michelsneukirchen (DE); Klaus Voth, Obertraubling (DE); Erik Blochmann, Neutraubling (DE); Wolfgang Roidl, Deuerling (DE); Frank Winzinger, Regensburg (DE)

(73) Assignee: Krones AG (DE)

( * ) Notice: Subject to any disclaimer, the term of this patent is extended or adjusted under 35 U.S.C. 154(b) by 351 days.

(21) Appl. No.: 12/878,999

(22) Filed: Sep. 9, 2010

(65) Prior Publication Data
US 2011/0061347 A1    Mar. 17, 2011

(30) Foreign Application Priority Data
Sep. 11, 2009 (DE) .................... 10 2009 040 977

(51) Int. Cl.
*B65B 1/02* (2006.01)

(52) U.S. Cl.
USPC ............................................... 53/55; 502/467

(58) Field of Classification Search
USPC ............................ 53/55, 467, 502, 503, 504
See application file for complete search history.

(56) References Cited

U.S. PATENT DOCUMENTS

| | | | | |
|---|---|---|---|---|
| 5,339,597 | A | 8/1994 | Naka et al. | 53/167 |
| 5,394,975 | A | 3/1995 | Bernhard | 198/473.1 |
| 2005/0126124 | A1* | 6/2005 | Munzer et al. | 53/415 |
| 2005/0188651 | A1* | 9/2005 | Clusserath | 53/136.1 |
| 2005/0194705 | A1 | 9/2005 | Smith | |
| 2005/0284102 | A1* | 12/2005 | Herzog | 53/75 |
| 2006/0037706 | A1 | 2/2006 | Putzer | 156/360 |
| 2007/0204562 | A1* | 9/2007 | Till et al. | 53/167 |
| 2007/0220835 | A1* | 9/2007 | Till | 53/471 |
| 2009/0158688 | A1 | 6/2009 | May et al. | 53/138.2 |
| 2009/0223175 | A1* | 9/2009 | Monzel | 53/456 |
| 2011/0172382 | A1* | 7/2011 | Yeh et al. | 526/282 |
| 2012/0085071 | A1* | 4/2012 | Hahn et al. | 53/411 |

FOREIGN PATENT DOCUMENTS

| | | |
|---|---|---|
| DE | 42 42 925 | 6/1994 |
| DE | 6904419 | 3/1997 |
| DE | 199 41 485 | 10/2000 |
| DE | 10 2006 051 533 | 4/2008 |
| DE | 10 2007 025521 | 12/2008 |
| DE | 10 2008 010 076 | 8/2009 |
| EP | 0 602 487 | 6/1994 |

(Continued)

OTHER PUBLICATIONS

Notice of Rejection issued by the Chinese Patent Office for corresponding application No. 2010102864999, dated May 9, 2012 (11 pgs).

(Continued)

*Primary Examiner* — Hemant M Desai
(74) *Attorney, Agent, or Firm* — Hayes Soloway P.C.

(57) ABSTRACT

A container treatment plant and a method for the treatment of containers are described. The container treatment plant includes a plurality of treatment elements, wherein each treatment element is used for a pre-determined treatment of the containers and each treatment element has associated therewith a container nominal value which indicates which type of container the treatment element can treat, a detection device for detecting properties of one of the containers to be treated, and a comparator device for comparing a detection result of the detection device with the container nominal value for at least one treatment element.

20 Claims, 3 Drawing Sheets

(56) References Cited

FOREIGN PATENT DOCUMENTS

| | | |
|---|---|---|
| EP | 0 744 224 | 11/1996 |
| EP | 0 894 544 | 2/1999 |
| EP | 1627816 | 2/2006 |
| EP | 2 258 623 | 12/2010 |
| ES | 2 238 921 | 1/2005 |
| WO | WO 2008/112414 | 9/2008 |

OTHER PUBLICATIONS

German Search Report, dated Sep. 11, 2009.
Chinese Office Action, dated Sep. 23, 2011 (11 pgs).
German Search Report dated Jan. 31, 2011 (8 pgs).

* cited by examiner

CONTAINER TREATMENT PLANT AND METHOD FOR THE TREATMENT OF CONTAINERS

The present invention relates to a container treatment plant and a container treatment method for the treatment of containers capable of being filled with a product.

BACKGROUND OF THE INVENTION

Container treatment plants usually have a plurality of modules, such as for example a stretch/blow mould module, a filling module, a labelling module and a packing module. In the stretch blow (mould) module, pre-forms are stretched and blow-moulded into containers, for example bottles. In the filling module the containers are filled and closed. In the labelling module the containers are labelled and in the packing module the containers are packed. Each of these plant modules thus performs a special treatment of the containers, such as stretch blow moulding, filling, labelling etc. In addition, inspection means and checking devices are usually present in or on the plant, which checks the containers for defects so that defective containers can be separated out.

To this end a container treatment plant comprises as a rule a plurality of different fixtures or treatment elements which are capable of being used in the various treatments of the containers. Treatment elements of this type are for example an inlet star and a heating mandrel of the stretch blow (mould) module, a filling valve of the filling module, a label gripper and a glue scraper of the labelling module etc., in order to name only at least a few of the numerous treatment elements.

When changing the type of the containers in a filling line of the container treatment plant it is frequently necessary for even at least a few of these fixtures or treatment elements to be exchanged.

DE 199 41 485 A1 discloses a packing machine, in particular for producing packages containing products. The packing machine has various format-dependent components which are provided with codes readable by a reading sensor. Wrong or absent format-dependent components are displayed to the user.

DE 693 04 419 T2 discloses a working head changer for a rotation system for the treatment of containers. In this case, in particular, changing a heating mandrel is described.

To this end, it has been necessary until now in the prior art, however, for almost all the treatment elements to be exchanged or adjusted by an operator by hand. This is highly demanding in terms of time and cost, however, since both considerable working force is required and prolonged refitting and thus stoppage times of the container treatment plants are necessary.

Consequently the object of the present invention is to make available a container treatment plant and a container treatment method for the treatment of containers capable of being filled with a product, by which the changing of the containers in the filling line of the container treatment plant is simplified and made time- and cost-effective.

SUMMARY OF THE INVENTION

The container treatment plant comprises a plurality of treatment elements, each treatment element being used for a pre-determined treatment of the containers and each treatment element having associated therewith a container nominal value which indicates which type of container the treatment element can treat, a detection device for detecting properties of one of the containers to be treated, and a comparator device for comparing a detection result of the detection device with the container nominal value for at least one treatment element.

The container treatment plant can, in addition, have an adaptor device for adapting at least one treatment element of the plurality of treatment elements if a comparison carried out by the comparator device reveals that the detection result of the detection device is not equal to the container nominal value for the at least one treatment element.

It is advantageous if the adaptor device is designed in such a way that it adapts the at least one treatment element of the plurality of treatment elements by exchanging the at least one treatment element.

The adaptor device can also, however, be advantageously designed in such a way that it adapts the at least one treatment element of the plurality of treatment elements by adjusting the at least one treatment element.

It is also possible for the container treatment plant to comprise a list compilation device for compiling a list in which the treatment elements are listed for which the comparison carried out by the comparator device reveals that the detection result of the detection device is not equal to the container nominal value for the at least one treatment element.

In addition, the container treatment plant can have a calculation device for calculating a sequence of adapting at least one treatment element of the plurality of treatment elements, in which sequence an opening of a protection device of the container treatment plant is not impeded by the adaptation of at least one treatment element of the plurality of treatment elements.

In addition, a device may be present for stopping the container treatment plant if a comparison carried out by the comparator device reveals that the detection result of the detection device is not equal to the container nominal value for the at least one treatment element.

As a further possibility the container treatment plant has a fault reporting device for emitting a fault report if a comparison carried out by the comparator device reveals that the detection result of the detection device is not equal to the container nominal value for the at least one treatment element.

It is preferable for the container treatment plant to have a display device for displaying a detection result of the detection device and/or a comparison result of the comparator device and/or a list compiled by the list compilation device and/or a calculation result of the calculation device and/or a stop of the container treatment plant and/or a fault report.

The container treatment plant can have a plurality of plant modules for carrying out a pre-determined treatment of the containers, each of the plurality of different plant modules having some of the plurality of treatment elements. In this case each of the plurality of different plant modules can have a plant module control device for controlling an operation of the plant module, and the plant module control devices can be connected in series.

The plant module control devices can be connected by way of a communication bus system.

It is advantageous if the plurality of plant modules comprises a stretch blow moulding module for carrying out a stretch blow moulding method in which containers for receiving a product are shaped from pre-forms and/or a filling module for filling the containers with at least one product and closing the containers and/or a labelling module for labelling the containers and/or a packing module for packing the filled and labelled containers.

The plurality of treatment elements can comprise a formula for the treatment of containers in a blow moulding device of the stretch blow moulding module.

The container treatment method is used for the treatment of containers capable of being filled with a product with a container treatment plant which has a plurality of treatment elements, each treatment element being used for a pre-determined treatment of the containers and each treatment element having associated therewith a container nominal value which indicates which type of container the treatment element can treat. In this case the method comprises the steps: detection of properties of one of the containers to be treated, and comparison of a detection result of the detection device with the container nominal value for at least one treatment element.

BRIEF DESCRIPTION OF THE DRAWINGS

The invention is described in greater detail below with reference to the accompany drawing and by way of an embodiment. In the drawing

DETAILED DESCRIPTION OF THE INVENTION

First Embodiment

Figure 1:
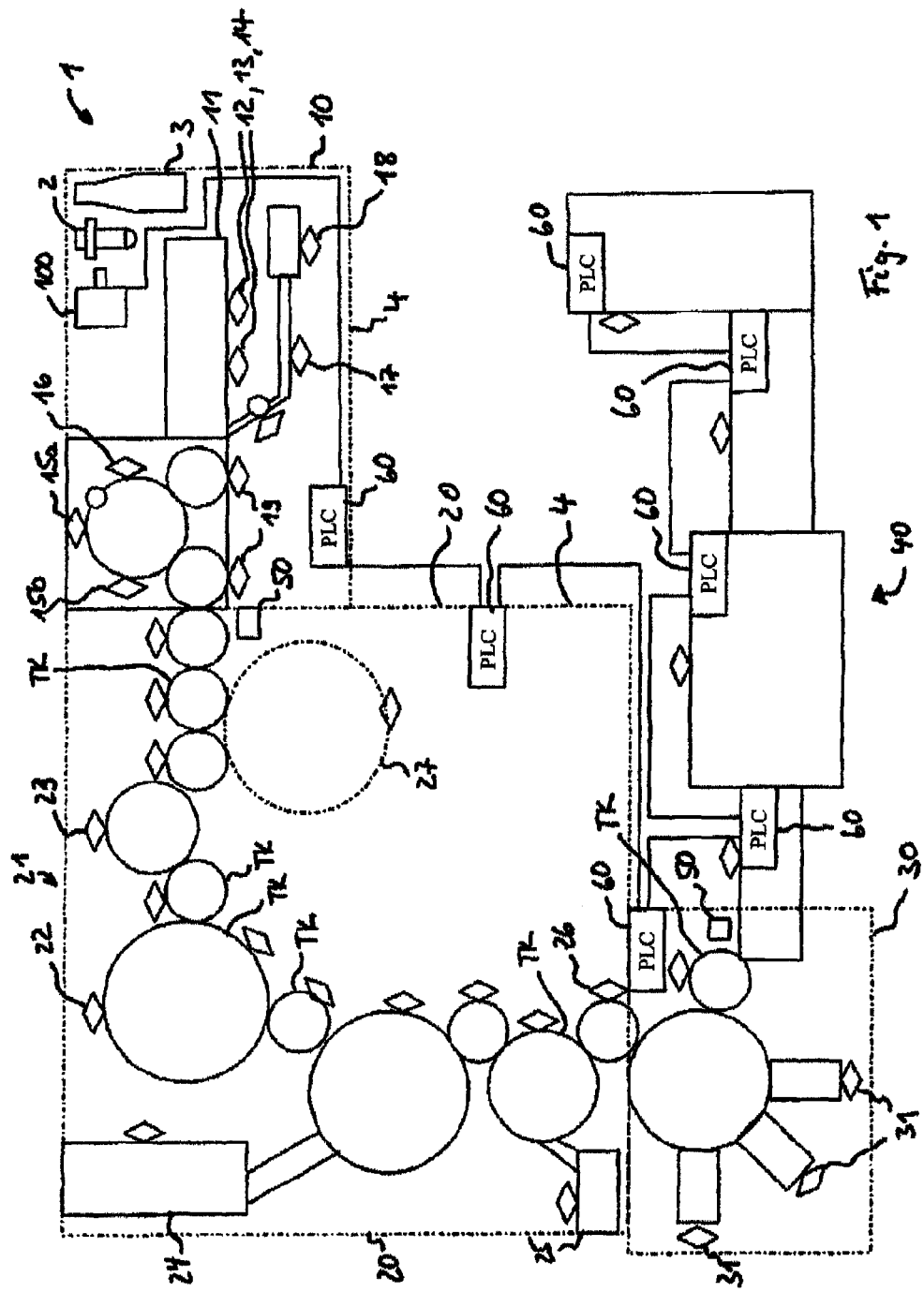
FIG. 1 is a diagrammatic illustration of a container treatment plant for the treatment of containers capable of being filled with a product according to a first embodiment.

FIG. 1 is a diagrammatic illustration of a container treatment plant 1 for the treatment of containers capable of being filled with a product. Pre-forms 2 of plastics material or glass containers 3 are supplied to the container treatment plant. The container treatment plant comprises a stretch blow mould module 10, a filling module or an automatic filling module changing means 20, a labelling module 30 and a packing module 40. The stretch blow mould module 10 and the filling module 20 are provided in each case with a protection device 4 in order to screen the stretch blow mould module 10 and the filling module 20 off from external influences or operating personnel from parts of the plant module which could possibly endanger them during the operation of the plant.

In the stretch blow mould module 10, pre-forms 2 of plastics material, such as for example polyethylene terephthalate (PET) or polyethylene (PP), are heated in a heating device 11 which comprises a heating mandrel or an automatic heating mandrel changing means 12, a screening plate or an automatic screening plate changing means 13 and reflectors or an automatic reflector changing means 14, and are shaped by means of a stretch blow moulding method into a container, such as for example a bottle, for a product, such as for example a liquid. To this end the stretch blow mould module 10 additionally comprises a stretch rod/blow moulding nozzle or an automatic stretch rod/blow moulding nozzle changing means 15a, a stretch curve/base curve automatic stretch curve/base curve adjusting or changing means 15b, a blow moulding device or an automatic blow moulding device changing means 16, a track setting device 17, a roll distance setting device 18 and clamps or an automatic clamp changing means 19 for gripping the containers.

During the supply of glass bottles 3 to the container treatment plant 1 the stretch blow mould module 10 can be by-passed. It should be pointed out that, in the sense of this description, the containers capable of being filled with a product should be taken to mean in particular the pre-forms 2, the containers or plastics material bottles produced therefrom and the glass bottles 3.

The containers for the product, which are produced from the stretch blow mould module 10, are supplied by way of conveying devices such as for example conveying turntables TK, to the filling module 20 which fills the containers with at least one product and then closes them To this end the filling module 20 comprises a cleaning device 21 with a sterilization station 22 and a rinser 23 for cleaning the containers, a product-mixing device 24 for mixing a product to be poured into the containers, a closure cap station 25 for the supply and application of closure caps on the containers, and a diversion star or clamps 26 for the further transport of the containers. If necessary, the containers arriving from the stretch blow mould module 10 are temporarily stored or buffered in a dynamic buffer 27.

After that, the filled and closed containers are supplied to the labelling module 30, are labelled thereby by means of at least one labelling device 31 and are then supplied by way of conveying devices, such as for example conveying turntables TK, to the packing module 40 in which the containers are packed.

In addition, the container treatment plant 1 comprises testing devices 50 for testing the containers 2 treated by means of the container treatment plant 1. In this case, as shown in FIG. 1, a testing device 50 is provided between the stretch blow mould module 10 and the filling module 20 and a further testing device 50 is provided between the labelling module 30 and the packing module 40. If necessary, however, the testing devices 50 can also be provided at other or further places in the container treatment plant 1. Defective containers can be separated out with the aid of a test result of the testing devices 50 before further treatment by other modules of the plant.

In addition, each of the modules 10, 20, 30 and 40 of the plant comprises a plant module control device 60, which can be for example a programmable [logic] control (PLC), as indicated in FIG. 1. In FIG. 1 the plant module control devices 60 are connected in series. The communication of the plant module control devices 60 between one another can be carried out by way of a wireless local [area] network (wireless LAN) or by way of Bluetooth.

In order to detect properties of the containers, the container treatment plant 1 additionally comprises a detection device 100 which can be a camera for example. The detection device 100 can also, however, be any sensor which is suitable for detecting properties of the containers, such as for example the geometry and/or the weight of the container. A sensor of this type can operate for example on the basis of an optical, magnetic or mechanical principle and so on. The detection device 100 is connected to the plant module control device 60 of the stretch blow mould module 10.

Figure 2:
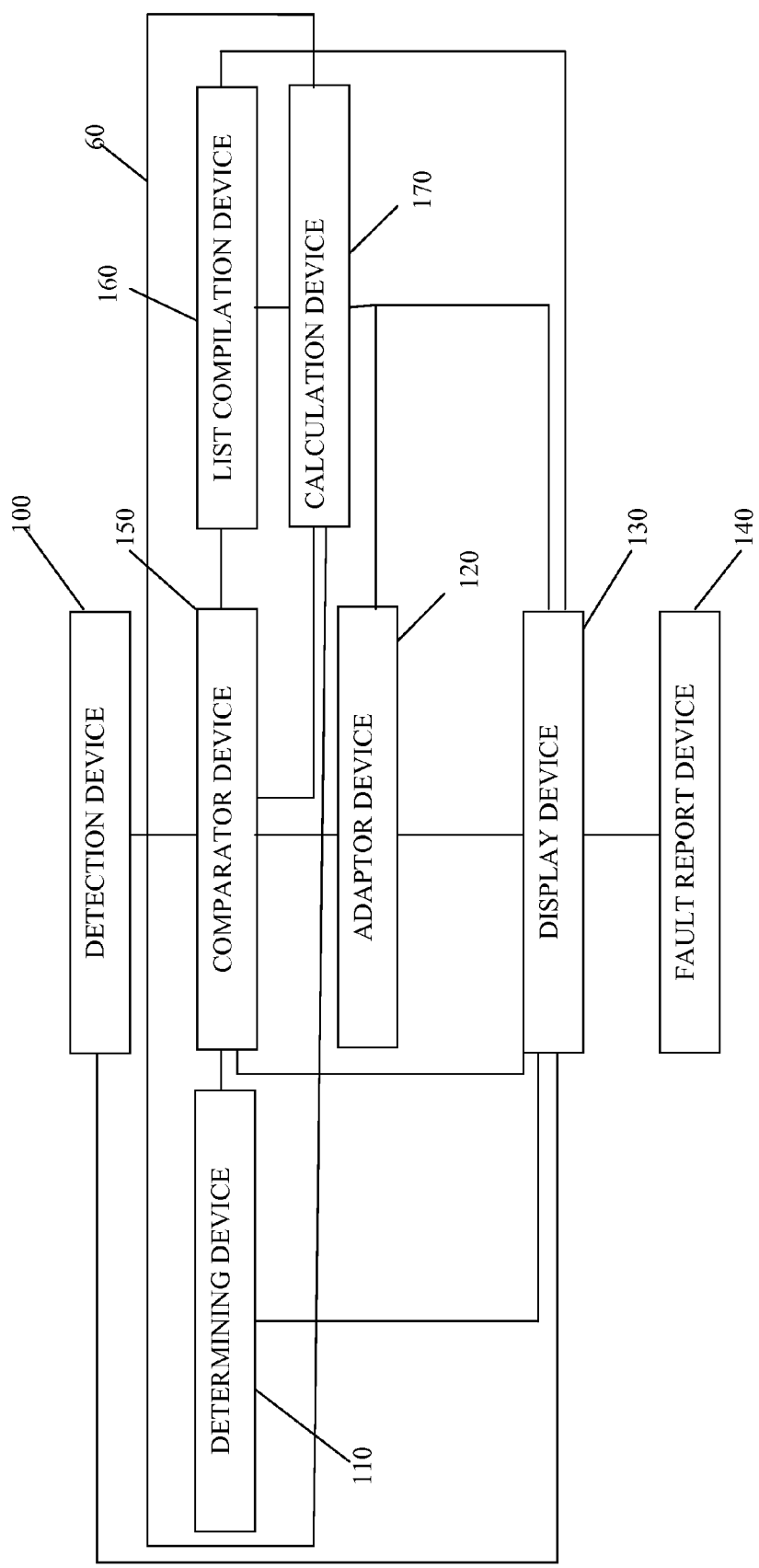
FIG. 2 is a diagrammatic illustration of a logic structure for the operation of the container treatment plant associated with an adaptor device, as shown in FIG. 1.

As shown in FIG. 2, each plant module control device 60 has a determining device 110, a comparator device 150, a list compilation device 160 and a calculation device 170.

In this case the determining device 110 is used to determine the treatment elements mounted in the container treatment plant 1 and treatment results to be achieved by means of treatment elements or formulae for the treatment of the containers which are described in greater detail below. To this end the treatment elements can be provided with RFID chips (RFID: radio frequency identification) and/or a code, such as for example a barcode or another two-dimensional code, which are readable by wireless or in accordance with an optical, magnetic or mechanical principle and so on. The function of the comparator device 150, the list compilation device 160 and the calculation device 170 will be described in greater detail below.

In addition, the container-treatment plant 1 has an adaptor device 120 shown in FIG. 2 for adapting the treatment elements mounted in the container treatment plant 1 and treatment results to be achieved by means of treatment elements or formulae for the treatment of the containers which are described in greater detail below. This means that in the sense of this description the term "treatment element" covers both a tool, such as for example the clips 19, and treatment results to be achieved by means of treatment elements as well as formulae for the treatment of the containers.

The container treatment plant 1 has, in addition, a display device 130 shown in FIG. 2 for displaying information for example on operating states of the container treatment plant 1 or the individual plant modules thereof 10, 20, 30, 40 or the treatment elements etc. thereof. The display device 130 can be any desired conventional display device.

In the event of a fault during the operation of the container treatment plant 1 a fault report device 140 can emit a fault report, such as for example an optical or acoustic alarm. The alarm can also be displayed by means of the display device 130.

As described above, each of the plant modules 10, 20, 30 and 40 carries out a special or pre-determined treatment of the containers, such as stretch blow moulding, filling, labelling etc.

To this end, each of the plant modules 10, 20, 30 and 40 of the container treatment plant 1 comprises a plurality of different fixtures or treatment elements which are capable of being used in the various treatments of the containers. This means that the blow mould module 10 comprises for example the following treatment elements: heating mandrel 12, screening plate 13, reflectors 14, stretch rod/blow moulding nozzle 15, track setting device 17, roll distance setting device 18, clamps 19 etc.

In addition, bottles are also meant in the following when the containers prepared from the pre-forms 2a or the glass containers 3 are mentioned.

Expressed more precisely, the individual named plant modules 10, 20, 30 and 40 of the container treatment plant and plant modules not shown (pasteurization module for pasteurizing products capable of being poured into containers, container cleaning module for cleaning containers and preferably returnable bottles, box washing module for washing boxes) of the container treatment plant comprise for example the following individual treatment elements and treatment results to be achieved by means of treatment elements or formulae, in which for the sake of simplicity the individual treatment elements have not all been illustrated in FIG. 1. In this case variable parameters are also illustrated in each case.

1) The container treatment plant 1 generally comprises for example: automatic speed setting (output of bottles per hour); differentiation of material (PET/PP; different types of glass)→setting of contact pressure of filling valves, blow moulding nozzle, label contact pressure); setting buffers to the maximum buffering time required; measurement, detection and display of filling states (pre-forms, filler/mixer→product to be poured and/or additives therefor ($CO_2$, $N_2$), sterilization liquid, closure caps, intermediate layers and foils for the pallets (emission of fault reports and new orders), conversion to further drive units, for example in order to adapt conveying speeds.

2) The stretch blow mould module 10 comprises for example: lance in the case of linear or rotation rinser (pre-form blowing) and conveying holders therefor; track distance of a pre-form supply; distance of the rolls of a roll sorting means for pre-forms; distance of receiving means from a vertical conveyor for pre-forms; size of a set of toothing of an inlet star (saw tooth star) for conveying pre-forms; heating mandrel (diameter and height and stroke); distance of the heating cabinets from pre-forms or of individual heating radiators from the pre-forms (profiling); distances of heating radiators from one another; diameter of receiving means of screening plates for heating mandrels or pre-forms; a formula for the heat treatment of pre-forms and/or expanding of pre-forms (time and magnitude of pre-blowing pressure, a finished blowing pressure, the beginning of pre-blowing, the beginning of rinsing, a temperature of the pre-form, a temperature of the wall of a blow mould, a temperature of a mould base, a time of the beginning of rinsing, a pressure pattern, a surface cooling of the pre-form, an aperture cooling of the pre-form, temperature of the blow moulds, combinations thereof or the like); clamps on transfer stars; blow moulds and bases; stretch rods or stretch rod tips; blow moulding nozzles (diameter); change in the base curve; setting of the stretch speed with servo or linear drive or change of a stretch curve to a further stretch curve with a different pitch; minimization of pressure of pressure cushions (no bottles—less pressure necessary as a whole—savings in energy) orientation of bottles towards the outlet star (and holders therefor); in the case of servo-driven mould carriers: opening stroke or change in the opening angle (in the case of bottles of small diameter the mould carriers need not go up so far and so time can be saved and wear/forces are reduced)

3) The filling module or the automatic filling module changing means 20 comprises for example: the product itself; clamps of the transfer stars; change of the filling valves; change of the closure caps and guides therefor; inlet; distribution screw conveyor, distribution star; guiding of containers; neck handling: neck stars, clamps; base handling: fixtures and treatment elements respectively; rinser clamps; neck holders in a filling or closing turntable; lowering star; protective chamber sheets in the filling means; filling valve: spacer members in a vacuum valve/filling valve; centring bells on the filling valve; return air pipes, elongate pipes; closing means: closing cones or heads; closure channels; gripping and positioning station; towing shoe (the closure itself is pulled off from the bottle by the shoe).

4) The labelling module 30 comprises for example: outlet tongue; guiding curve machine inlet; guiding curve machine outlet; inlet star; tongue for inlet star; locking star is present; distribution screw conveyors; inlet guide on the outside and on the inside; transfer screw conveyors; braking roll for "staniolization"; base gripping means; tilting gripping means; centring bell; label gripping means; bottle gripping means (neck handling gripping means, base levellers); gripping cylinders; receiving mandrels; displacement gripping means; label dispensers and slides therefor; gluing rollers; glue (hot glue, cold glue); control strip guides; glue scrapers; means for scraping off labels; glue segment spacers; means for brushing on labels (diameter, height, hardness); rolling on ("); compartments (for an exact guidance of the bottle in the inlet/outlet of the labelling module); sponge roll on the conveyor belt (for pressing on the label, variation in the distance and diameter, in a manner dependent upon the diameter of the bottle);

curved segment of the bench (curved segment for controlling the rotation of the bottle, vs. servo); speed regulation of the servo drive (adaptation to new angles to be turned); changing mandrel in the sleeve; correct devices are present/turned on; correct labels inserted (dependent upon the client).

5) The packing module 40 comprises for example: change of the distribution strips; change of the expansion wedge in the case of two strips; change of the push rods in another machine distribution; change of the support posts; multiple- or entire-layer packing and palletizing gripper heads of widely differing types; row-wise packing and palletizing gripper heads of widely differing types; changeable separation sheets for clamping gripping means; guiding metal sheets for bottle bench; covering hoods for dust protection; insertion frames for the packing-in of container; automatic top load calculation (how many layers of bottles should be arranged one on top of the other in a pallet, without the bottle being damaged or crushed) and adaptation of the layers.

6) The testing device 50 comprises for example: guide rails; bottle gripping means; programs for detection.

7) The pasteurization module comprises for example a change from one formula to another, an automatic conversion of the heating or cooling power of heaters or coolers, an automatic adaptation of the height of blowing appliances to a new height of a container.

8) The container cleaning module comprises for example a change: the attachment members and a vibrator for pushing tasks in the conveying of bottles, a position of a feed bench field for bottles for the insertion of containers into the machine, various attachments for dispensing from the machine in the case of dispensing in the channels, temperature and concentration of the cleaning liquid with which the bottles or containers come into contact, pressure and directions of jets of cleaning or rinsing agents which are directed onto or into the container, exchange of conveying baskets in which the containers are moved through the container cleaning module, guiding metal sheets provided with a special bending for stopping containers not present in the correct position (containers which have fallen over or are horizontal), changing the width of conveyor conveying channels (dependent upon the diameter of the container).

9) The box washing module comprises for example: settings of a guide rail, on which the boxes are guided during the conveying, and of a cam move and other software changes.

In particular, specific packing material determined by the adaptor device on the basis of the detection result, such as labels, information chips to be entered in the containers such as RFID—transponders, printer ink for direct printing on labels or on the containers, printing positions or the best before date can be automatically adapted.

The specified plant modules 10, 20, 30 and 40 and the numerous treatment elements thereof specified above are known in each case from the prior art and are consequently not described in greater detail here. It is preferable for the respective adaptation of the treatment elements to be carried out fully automatically.

The operation of the container treatment plant 1 in conjunction with the adaptor device 120 is described in greater detail below.

In a filling line of the container treatment plant 1 the detection device 100 detects properties of one of the containers 2, 3 to be treated, as described above. The detection results of the detection device 100 are supplied to the comparator device 150. The comparator device 150 then carries out a comparison of a detection result or the detection results of the detection device 100 with a container nominal value for the plurality of treatment elements 11 to 19, 21 to 27, 31.

The container nominal value indicates what type of container 2, 3 the treatment element 11 to 19, 21 to 27, 31 can treat. That means that the container nominal value reveals for example whether the container 2, 3 is a pre-form 2 for a plastics material bottle holding 0.5 liters for example, a pre-form 2 for a plastics material bottle holding 1.0 liter for example, a pre-form 2 for a plastics material bottle holding 1.5 liters for example and so on, or a pre-form 2 of PET or PP, or a glass bottle 3 and so on. Further values which can be associated with the nominal value of a container 2, 3 are: A height and/or a diameter of a mouthpiece of a pre-form 2 or container 2, 3; a diameter of a conveying ring (bulging in the shoulder region of plastics material bottles, in particular PET bottles); an overall height or a maximum diameter of a container, such as for example a bottle; a diameter at a specified height for engaging treatment units, specifically the diameters directly above and below the conveying ring, a ground clearance of a shaped-out container, for example a bottle (distance between feet of the bottle to the injection point); a material or a material composition of the container 2, 3; a crystallinity of the material of the container 2, 3; a type of the thread and/or of a closure (for example cork, snap closure, crown cork) of the container 2, 3; a diameter and a height of the closure; a colour of the container material; a wall thickness of the container 2, 3 in specified regions; strengths, such as for example top load, of the container 2, 3.

The container nominal value can be stored beforehand in a memory device (not illustrated). This memory device can be in particular the RFID chip or code mentioned above, which is attached to the treatment elements. It is preferable for it to be a barcode.

If a comparison carried out by the comparator device 150 shows that the detection result of the detection device 100 is not equal to the container nominal value for the at least one treatment element 11 to 19, 21 to 27, 31, the adaptor device 120 can adapt at least one treatment element 11 to 19, 21 to 27, 31 of the plurality of treatment elements 11 to 19, 21 to 27, 31. This means that the adaptor device 120 can either exchange or adjust the at least one treatment element 11 to 19, 21 to 27, 31 of the plurality of treatment elements 11 to 19, 21 to 27, 31.

In addition, the list compilation device 160 can compile a list in which the treatment elements 11 to 19, 21 to 27, 31 are listed for which the comparison carried out by the comparator device 150 reveals that the detection result of the detection device is not equal to the container nominal value for the at least one treatment element 11 to 19, 21 to 27, 31. The list can be displayed on the display device 130. In this case the list can give indications as to which treatment elements are still to be exchanged or adjusted, and/or indicate which treatment elements are just exchanged or adjusted. In this way, an operator can choose whether the treatment elements still to be exchanged or adjusted should be automatically exchanged or adjusted, i.e. adapted, or whether the operator wishes to adapt specified treatment elements himself or herself in an optional manner.

It is preferable for the calculation device 170 to carry out a calculation of a sequence which is a sequence of an adaptation of at least one treatment element 11 to 19, 21 to 27, 31 of the plurality of treatment elements 11 to 19, 21 to 27, 31. This sequence is a particularly advantageously a sequence in which an opening of the protection device 4 of the container treatment plant 1 is not impeded by the adaptation of at least one treatment element 11 to 19, 21 to 27, 31 of the plurality of treatment elements 11 to 19, 21 to 27, 31. This sequence too can be displayed on the display device 130.

If the comparison carried out by the comparator device 150 reveals that the detection result of the detection device is not equal to the container nominal value for the at least one treatment element 11 to 19, 21 to 27, 31, the control devices 60 of the plant modules prevent operation of the container treatment plant 1. This means that, if the container treatment plant 1 is still in operation when the comparison carried out by the comparator device 150 gives the result specified, the container treatment plant 1 is brought by a device (not shown) to a stop of the container treatment plant 1. If the container treatment plant 1, however, is not in operation or is stopped when the comparison carried out by the comparator device 150 gives the result specified, starting of the container treatment plant 1 is made impossible or prevented. To this end the container treatment plant 1 can comprise a device (not shown) for preventing a start of the container treatment plant 1. The forcible stop of the container treatment plant 1 or the forcible prevention of a start of the container treatment plant 1 can likewise be displayed on the display device 130.

In the cases specified, in which adaptation of at least one treatment element 11 to 19, 21 to 27, 31 is necessary, a fault report can additionally be emitted by means of a fault report device 140 and it can also be displayed on the display device 130.

Since the individual control devices 60 of the plant modules according to this embodiment are connected in series, it is possible for example for the plant module control device 60 of the filling module 20 to build on the results which have already been achieved by the plant module control device 60 of the stretch blow mould module 10. This means that the comparator device 150, the list compilation device 160 and the calculation device 170 of the plant module control device 60 of the filling module 20 can make use not only of the container nominal values as is the case for the comparator device 150, the list compilation device 160 and the calculation device 170 of the plant module control device 60 of the stretch blow mould module 10, but also in consideration of those values already used by the comparator device 150, the list compilation device 160 and the calculation device 170 of the plant module control device 60 of the stretch blow mould module 10.

Second Embodiment

Apart from the design of the control of the plant modules 10, 20, 30 and 40, the second embodiment is identical to the first embodiment. In the following, therefore, only the parts of the second embodiment which are different from the first embodiment are described. The same parts and parts with the same significance are provided with the same reference numbers.

Figure 3:
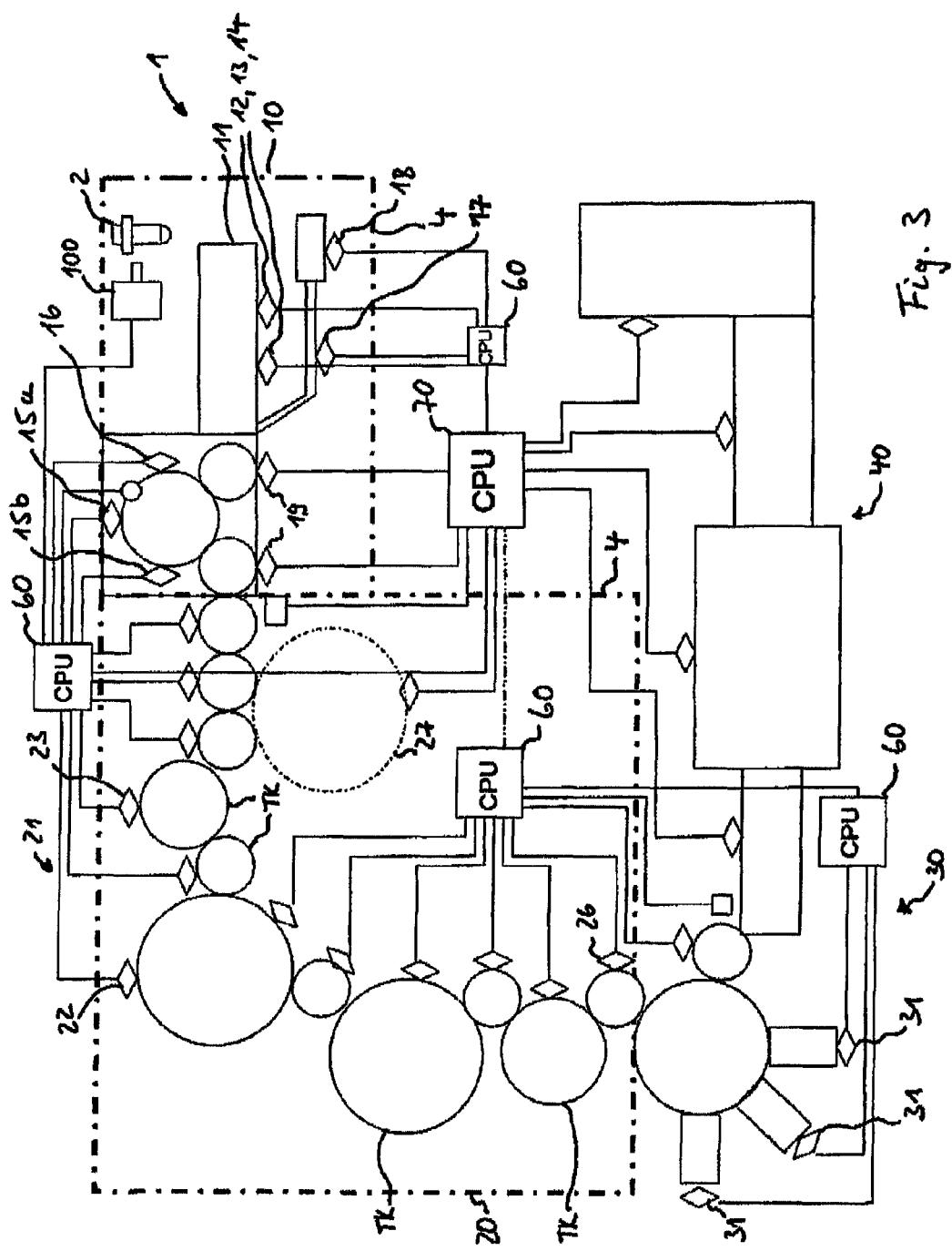
FIG. 3 is a diagrammatic illustration of a container treatment plant for the treatment of containers capable of being filled with a product according to a second embodiment.

As it is evident from FIG. 3, the individual plant control devices 60 are not connected in series, as in the case of the first embodiment, but they are connected to a central plant control device 70 by way of a bus system. This central plant control device 70 is superordinate to the individual plant control devices 60 and can give the individual plant control devices 60 control commands which the individual plant control devices 60 can implement for the plant modules 10, 20, 30 and 40. As is additionally indicated in FIG. 3, both the individual plant control devices 60 and the central plant control device 70 have a CPU (central processing unit).

According to the second embodiment the central plant control device 70 comprises the comparator device 150, the list compilation device 160 and the calculation device 170.

The central plant control device 70 then gives each of the plant module control devices 60 commands on the basis of the results achieved by the comparator device 150, the list compilation device 160 and the calculation device 170.

As shown in FIG. 3, the individual treatment elements are associated with other plant control devices 60, as shown in FIG. 1. This association can also be chosen differently, depending upon requirements.

All the other elements and functions in this embodiment are the same as those of the first embodiment and will therefore not be described once more here.

(General)

All the arrangements of the container treatment plant 1 and of the container treatment method, which are described above, can be used individually or in any possible combinations. In this case in particular the following modifications are possible.

The container treatment plant 1 can also be controlled by way of a separate computer. In this case an interface can be present on the detection device 100, which in particular can be a camera. The detection device 100 can communicate with the separate computer by way of the interface, for example by wires, by radio etc.

The assessment of the results, which are detected by the detection device 100 and which can be signals, can also be carried out directly in the detection device 100, which is a sensor for example.

By way of example, the adaptor device 120 can be a robot which shuts down all the treatment elements of the container treatment plant 1 and makes the necessary adaptations of the treatment elements.

It is additionally possible for the exchange of the treatment elements to be carried out without tools by means of the adaptor device 120. This is possible in particular for the pivot arm and/or the heating mandrels 12 and/or the screen plate 13 for example.

In addition, the adaptation of the treatment elements of the filling module 20, the labelling module 30 and the packing module 40 as well as the testing devices 50 can be carried out automatically if a suitable choice of the formula has been made on the stretch blow mould module 10, for example by an operator. The input of the operator could be undertaken in practice by the choice of the formula, or by the input of the choice of the formula, in particular by way of a switching device (not shown), such as for example a push button.

It is additionally possible for the adaptor device 120 to adapt only part of the treatment elements, which have been specified as a whole to be adapted. In this case it is possible for at least two treatment elements to be changed automatically by the adaptor device 120, whereas the other treatment elements, which are specified as still to be adapted, are adapted by an operator. Instead of the at least two treatment elements, it is also possible for at least three or more treatment elements to be changed automatically by the adaptor device 120.

All the features disclosed in the application documents are claimed as being essential to the invention, insofar as they are novel either individually or in combination as compared with the prior art.

LIST OF REFERENCES

1 container treatment plant
2 pre-forms
3 glass container
4 protection device
10 stretch blow mould module
11 heating device 12 heating mandrel or automatic heating mandrel changing means
13 screening plate or automatic screening plate changing means
14 reflectors or an automatic reflector changing means
15a stretch rod/blow moulding nozzle or automatic stretch rod/blow moulding nozzle changing means
15b stretch curve/base curve or automatic stretch curve/base curve adjusting or changing means
16 blow moulding device or automatic blow moulding device changing means
17 track setting device
18 roll distance setting device
19 clamps or automatic clamp changing means
20 filling module or automatic filling module changing means
21 cleaning device
22 sterilization station
23 rinser
24 product mixing device
25 closure cap station
26 deflecting star or clamps
27 dynamic buffer (Acculink)
30 labelling module
31 labelling device
40 packing module
50 testing device
60 plant module control device
70 central plant module control device
100 detection device
110 determining device
120 adaptor device
130 display device
140 fault report device
150 comparator device
160 list compilation device
170 calculation device
TK conveying turntable

The invention claimed is:

1. A container treatment plant for the treatment of containers capable of being filled with a product, said plant including a plurality of treatment elements for pre-determined treatment of the containers each treatment element having associated therewith a container nominal value which indicates which type of container the treatment element can treat, a sensor for detecting a physical property of one of the containers to be treated, and a comparator device for comparing a detection result of the sensor with the container nominal value for at least one treatment element and with an adaptor device for adapting at least one treatment element of the plurality of treatment elements if a comparison carried out by the comparator device reveals that the detection result of the sensor is not equal to the container nominal value for the at least one treatment element, wherein the adaptor device is designed to adapt the at least one treatment element.

2. The container treatment plant according to claim 1, wherein the adaptor device is designed to adapt the at least one treatment element of the plurality of treatment elements by adjusting the at least one treatment element.

3. The container treatment plant according to claim 1, further comprising a list compilation device for compiling a list in which the treatment elements are listed for which the comparison carried out by the comparator device reveals that the detection result of the detection device is not equal to the container nominal value for the at least one treatment element.

4. The container treatment plant according to claim 2, further comprising a calculation device for calculating a sequence of adapting at least one treatment element of the plurality of treatment elements, in which sequence an opening of a protection device of the container treatment plant is not impeded by the adaptation of at least one treatment element of the plurality of treatment elements.

5. The container treatment plant according to claim 1, further comprising a device for stopping the container treatment plant if a comparison carried out by the comparator device reveals that the detection result of the detection device is not equal to the container nominal value for the at least one treatment element.

6. The container treatment plant according to claim 1, further comprising a fault reporting device for emitting a fault report if a comparison carried out by the comparator device reveals that the detection result of the detection device is not equal to the container nominal value for the at least one treatment element.

7. The container treatment plant according to claim 6, further comprising a display device for displaying a detection result of the detection device and/or a comparison result of the comparator device and/or a list compiled by the list compilation device and/or a calculation result of the calculation device and/or a stop of the container treatment plant and/or a fault report.

8. The container treatment plant according to claim 1, further comprising a plurality of plant modules for carrying out a pre-determined treatment of the containers, wherein each of the plurality of different plant modules has some of the plurality of treatment elements.

9. The container treatment plant according to claim 8, wherein each of the plurality of different plant modules has a plant module control device for controlling an operation module, and wherein the plant module control devices are connected in series.

10. The container treatment plant according to claim 9, wherein each of the plurality of different plant modules has a plant module control device for controlling an operation of the plant module, and wherein the plant module control devices are connected by way of a communication bus system.

11. The container treatment plant according to claim 9, wherein the plurality of plant modules comprises a stretch blow moulding module for carrying out a stretch blow moulding method in which containers for receiving a product are shaped from pre-forms and/or a filling module for filling the containers with at least one product and closing the containers and/or a labelling module (30) for labelling the containers and/or a packing module for packing the filled and labelled containers.

12. The container treatment plant according to claim 11, wherein the plurality of treatment elements comprises a formula for the treatment of containers in a blow moulding device of the stretch blow moulding module.

13. The container treatment plant according to claim 1, wherein the adaptor device is designed to automatically adapt the at least one treatment element.

14. The container treatment plant according to claim 1, wherein the treatment elements are provided with a RFID chips and/or a machine readable code, which are readable by wireless or with an optical, magnetical or mechanical principle.

15. The container treatment plant according to claim 1, wherein the treatment element covers both a tool and a treatment protocol for the treatment of containers.

16. The container treatment plant according to claim 1, wherein the plant comprises a display device.

17. A container treatment method for the treatment of containers being filled with a product with a container treatment plant, the method comprising:
- providing a plurality of treatment elements, wherein each treatment element is used for a pre-determined treatment of the containers and each treatment element has associated therewith a container nominal value which indicates which type of container the treatment element can treat;
- detecting properties of one of the containers to be treated with a detecting device, and comparing with a comparator device a detection result of the detection device with the container nominal value for at least one treatment element;
- adapting at least one treatment element of the plurality of treatment elements with an adaptor device; and
- exchanging the at least one treatment element of the plurality of treatment elements if a comparison carried out by the comparator device reveals that the detection result of the detection device is not equal to the container nominal value for the at least one treatment element.

18. The method according to claim 17, wherein the adaptor device automatically adapts the at least one treatment element.

19. The method according to claim 17, wherein the predetermined treatment of the containers includes a shaping of plastic performs into plastic containers.

20. The method according to claim 17, wherein the predetermined treatment of the containers includes a filling of the containers with a liquid.

* * * * *